US008639461B2

(12) United States Patent
Sweeney et al.

(10) Patent No.: US 8,639,461 B2
(45) Date of Patent: Jan. 28, 2014

(54) JITTER DIGITIZER

(75) Inventors: John F. Sweeney, Colchester, VT (US); James Mallabar, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 12/558,625

(22) Filed: Sep. 14, 2009

(65) Prior Publication Data

US 2011/0064178 A1    Mar. 17, 2011

(51) Int. Cl.
| G01R 13/00 | (2006.01) |
| G01R 29/26 | (2006.01) |
| G01R 31/00 | (2006.01) |

(52) U.S. Cl.
USPC ........................................ 702/69; 324/754.19

(58) Field of Classification Search
USPC .......................................................... 702/69
See application file for complete search history.

(56) References Cited

U.S. PATENT DOCUMENTS

| 5,481,563 | A | * | 1/1996 | Hamre | 375/226 |
| 5,889,435 | A | | 3/1999 | Smith et al. | |
| 6,037,812 | A | | 3/2000 | Gaudet | |
| 6,509,766 | B1 | | 1/2003 | Pomichter et al. | |
| 7,035,325 | B2 | | 4/2006 | Kleck et al. | |
| 7,339,364 | B2 | | 3/2008 | Kam et al. | |
| 7,379,005 | B2 | | 5/2008 | Wiesbauer et al. | |
| 7,813,297 | B2 | * | 10/2010 | Hafed | 370/252 |
| 8,000,429 | B2 | * | 8/2011 | Abe et al. | 375/371 |
| 2003/0215037 | A1 | | 11/2003 | Chao et al. | |
| 2003/0219091 | A1 | * | 11/2003 | Riley | 377/47 |
| 2005/0044463 | A1 | | 2/2005 | Frisch | |
| 2005/0147197 | A1 | | 7/2005 | Perrott | |
| 2005/0207523 | A1 | * | 9/2005 | Mori | 375/376 |
| 2007/0280032 | A1 | | 12/2007 | Kwak | |

FOREIGN PATENT DOCUMENTS

JP    2004279155    10/2004

* cited by examiner

*Primary Examiner* — Alexander H Taningco
*Assistant Examiner* — Yaritza H Perez Bermudez
(74) *Attorney, Agent, or Firm* — Gibb & Riley, LLC; Michael J. LeStrange, Esq.

(57) ABSTRACT

A circuit and method for digitizing jitter in a high speed digital signal receives a digital signal using a comparator and supplies a clock signal to a counter. The circuit and method determine the frequency of the digital signal using the clock signal and the counter, and calculate the period of the digital signal based on the frequency (using a logic element). The method and circuit provide a linearized delay for jitter analysis based on the period of the digital signal (using a delay shift circuit) and output a delayed digital signal from the digital signal based on the linearized delay (using a measure delay circuit). The circuit and method supply the digital signal and the delayed digital signal to a programmable unit. The programmable unit comprises flip flops. The circuit and method count transitions of the flip flops within the programmable unit using the counter. The flip flops transition when the digital signal differs from the delayed digital signal. The circuit and method repeat the counting of the transitions of the flip flops for different time intervals to generate a jitter histogram of the digital signal using the logic element.

16 Claims, 4 Drawing Sheets

JITTER DIGITIZER

BACKGROUND

1. Field of the Invention

The embodiments of the invention generally relate to integrated circuit structures and, more specifically, to an improved system and method for digitizing jitter in a high speed digital signal.

2. Description of the Related Art

Conventional circuits that contain phase-locked loops (PLLs) may need to have their jitter performance verified. Such circuits use a precision reference clock; ADCs (Analog to Digital Converters); DACs (Digital to Analog Converters); or an analog phase detector circuitry for measuring jitter quickly and accurately.

SUMMARY

In view of the foregoing, disclosed herein is a circuit and method of measuring jitter without the need for external instruments, or a precision clock. The measurements are collected quickly and with a very high degree of precision using a delay block and common non-critical clock signal.

In one example, a system for digitizing jitter in a high speed digital signal comprises a comparator that receives a digital signal. The comparator establishes a trigger point within the digital signal for the jitter analysis. A feedback loop is operatively connected to (directly or indirectly connected to) the comparator for calibration of the delay. The feedback loop comprises a ring oscillator operatively connected to the comparator. The feedback loop calibrates delay lines within the system when needed.

A reference signal generator is operatively connected to the comparator. The reference signal generator generates an offset reference signal from the digital signal. A programmable unit comprising flip flops is operatively connected to the reference signal generator. The programmable unit divides the offset reference signal into a divided signal. A counter is operatively connected to the Flip Flop/Divide unit.

A local clock generator is operatively connected to the counter. The clock generator supplies a clock signal to the counter. The clock generator comprises a non-critical clock generator. The counter determines the frequency of the divided signal using the clock signal. A logic element is operatively connected to the counter. The logic element calculates the period of the divided signal based on the frequency.

A delay shift circuit is operatively connected to the logic element. The delay shift circuit provides a linearized delay for the jitter analysis based on the period of the divided signal. A delay table is operatively connected to the delay shift circuit. The delay shift circuit uses the linearization table to calculate the linearized delay.

A measure delay circuit is operatively connected to the delay shift circuit, the programmable unit, and the comparator. The measure delay circuit outputs a delayed digital signal from the digital signal based on the linearized delay.

The flip flops within the programmable unit transition when the offset reference signal crosses the delayed digital signal. The counter counts transitions of the flip flops. Further, an interval counter is operatively connected to the clock generator and to the counter. The interval counter establishes the time intervals in which the counter counts the transitions of the flip flops. The logic element repeats the counting of the transitions of the flip flops for different time intervals to generate a jitter histogram of the digital signal.

Method embodiments for digitizing jitter in a high speed digital signal are also disclosed herein. One method receives the digital signal into the circuit and establishes the trigger point within the digital signal for jitter analysis using the comparator. The method calibrates delay lines within the circuit using the feedback loop and generates the offset reference signal from the digital signal using the reference signal generator. The method also divides the offset reference signal into the divided signal using the programmable unit (that comprises flip flops).

The method supplies the clock signal to the counter using the clock generator and determines the frequency of the divided signal using the clock signal and the counter. The method calculates the period of the divided signal based on the frequency using the logic element.

The method provides the linearized delay for the jitter analysis based on the period of the divided signal using the delay shift circuit (referring to the linearization table). Further, the method outputs the delayed digital signal from the digital signal based on the linearized delay using the measure delay circuit.

The method supplies the divided signal and the delayed digital signal to the programmable unit. The flip flops within the programmable unit transition when the offset reference signal differs from the delayed digital signal. The method counts transitions of the flip flops using the counter and repeats the counting of the transitions of the flip flops for different time intervals to generate the jitter histogram of the digital signal using the logic element. The method establishes the time intervals in which the counter counts the transitions of the flip flops using an interval counter.

BRIEF DESCRIPTION OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, conventional circuits that contain phase-locked loops (PLLs) may need to have their jitter performance verified using a precision reference clock; ADCs (Analog to Digital Converters); DACs (Digital to Analog Converters); or an analog phase detector circuitry for measuring jitter quickly and accurately.

In view of the foregoing, disclosed herein is a circuit and method of measuring jitter without the need for external instruments, or a precision clock. The measurements are collected quickly and with a very high degree of precision using a feedback loop and common non-jitter refined clock signal.

Figure 1:
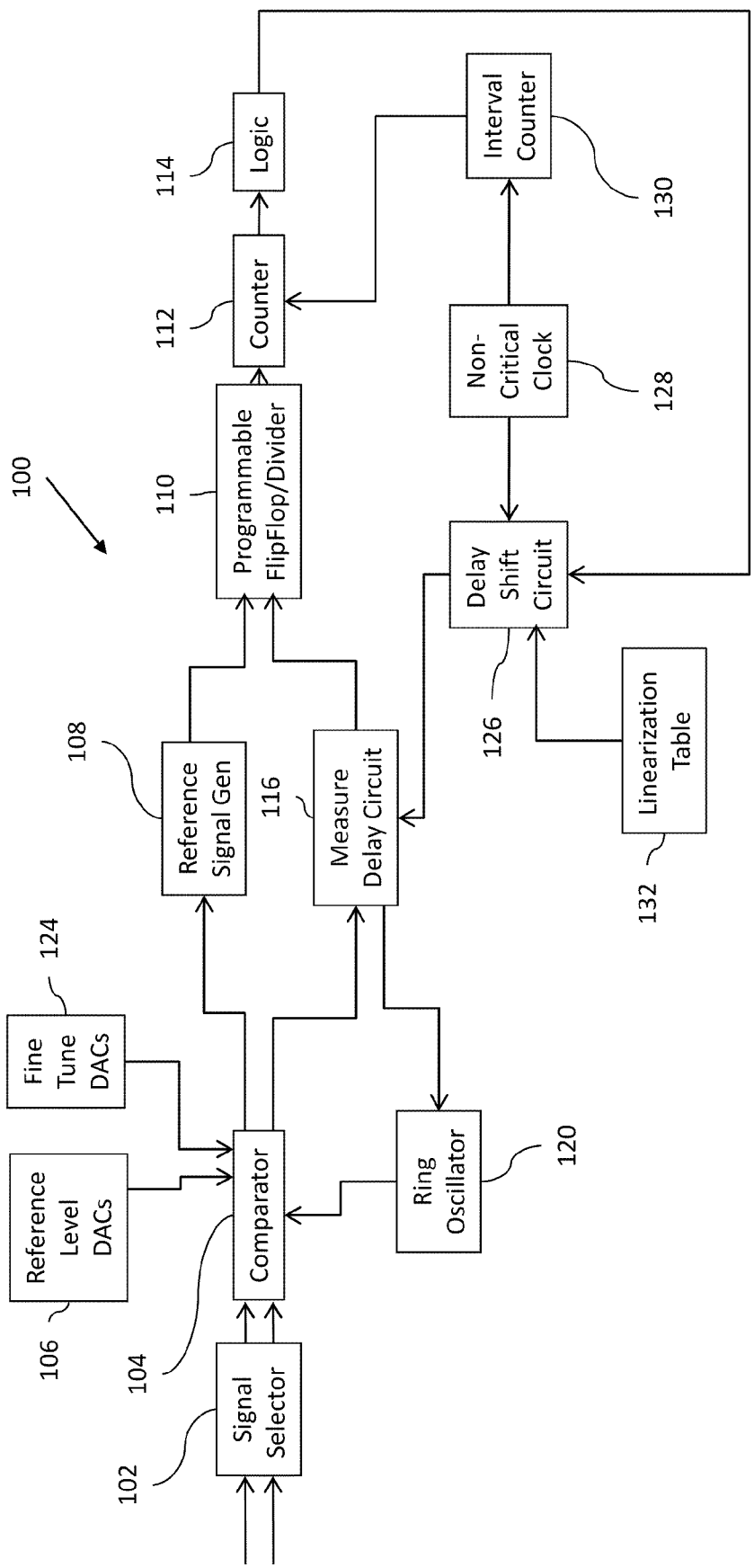
FIG. 1 is a schematic diagram of an embodiment herein.

In one example show in FIG. 1, a system or circuit 100 for digitizing (measuring) jitter in a high speed digital signal comprises a comparator 104 that receives one or more a digital signals from a signal selector 102. The signal selector 102 can select from one signal (if the digital signal is to be compared to itself) or two signals, such as input and output signals of a phase-locked loop or PLL (if the two signals are to be compared to each other).

The comparator 104 establishes a trigger point within the digital signal for the jitter analysis using, for example, a reference level digital to analog converter (DAC) 106 as a reference item. A fine tune DAC 124 is used by the comparator 104 to refine the selection of the trigger point.

The trigger point could be selected to be the midpoint of the square wave (e.g., 50%) if a signal is being compared to itself or could be selected to one end of the wave (e.g., 10%, 20% 80%, 90%, etc.) if an input signal is being compared to an output signal.

A feedback loop is operatively connected to (directly or indirectly connected to) the comparator 104. The feedback loop comprises a ring oscillator 120 operatively connected to the comparator 104. The feedback loop can be used to occasionally calibrate the various delay lines within the circuit.

A reference signal generator 108 is operatively connected to the comparator 104. The reference signal generator 108 generates an offset reference signal from the digital signal. For example, the reference signal generator 108 moves the digital signal off the zero point by some amount, such as one-half a cycle. A flip flop/divider 110 (programmable unit) is operatively connected to the reference signal generator 108. The flip flop/divider 110 detects the reference and delayed signals crossing in time and provides a pulse to the counter. A counter 112 is operatively connected to the flip flop/divider 110 and receives the pulse from the flip flop/divider 110.

A local non-critical clock generator 128 is operatively connected to the counter 112. The clock generator 128 is physically part of the circuit 100 and is not external to the circuit 100, and does not make reference to external items. An interval counter 130 is connected to the counter 112 to count time intervals produced by the clock 128. The clock generator 128 supplies the clock signal to the counter 112. The clock generator 128 comprises a non-critical clock generator 128.

The counter 112 determines the frequency of the divided signal using the clock signal by counting the number of cycles of the divided signal within each time period produced by the clock 128. A logic element 114 is operatively connected to the counter 112. The logic element 114 comprises a computer-readable storage medium that stores instructions. The logic element 114 also includes one or more processors that execute the instructions that are stored on the computer-readable storage medium to perform the various actions described in this disclosure. In one example, the logic element 114 executes such instructions to calculate the period of the divided signal based on the frequency found by the counter 112.

A delay shift circuit 126 is operatively connected to the logic element 114. The delay shift circuit 126 provides a linearized delay for the jitter analysis based on the period of the divided signal. A delay table can be maintained within the delay shift circuit 126 or can be connected to the delay shift circuit 126 as shown in item 132. The delay shift circuit 126 uses the linearization table 132 to calculate the linearized delay.

A measure delay circuit 116 is operatively connected to the delay shift circuit 126, the flip flop/divider 110, and the comparator 104. The measure delay circuit 116 outputs a delayed digital signal by delaying the digital signal based on the linearized delay (if a signal is being compared to itself for jitter). Alternatively, the measure delay circuit 116 outputs a delayed digital signal by delaying one of the two different input signals based on the linearized delay (if two signal are being compared for jitter). More specifically, the measure delay circuit 116 delays the digital signal (or one of the pair of input signals) one or more cycles that will maintain a linearized delay (as determined by the delays shift circuit 126). For example, if the delay shift circuit 126 determines that a delay of 1, 3, 6, 8, 9, or 10 cycles will maintain a linearized delay, the measure delay circuit 116 can select any of these cycle delays and still maintain a linearized delay for purposes of jitter analysis. The measure delay circuit 116 can perform various analyses on different cycle delays to evaluate different jitter measurements.

Therefore, the measure delay circuit 116 outputs to the flip flop/divider 110 either a delayed version of the digital signal (if a single signal is being compared to itself) or a delayed version of one of the two inputs signals (if two signals are being compared against each other). The referenced signal generator 108 outputs to the flip flop/divider 110 either the offset digital signal itself or an offset version of the other of the two signals being compared against each other. The referenced signal generator 108 moves either of the signals off zero (for example one-half a cycle, as discussed above) before outputting either of the signals as an offset referenced signal to the flip flop/divider 110.

The flip flop/divider 110 transitions when the offset referenced signal output from the referenced signal generator 108 crosses the delayed digital signal output from the measure delay circuit 116. The counter 112 counts transitions of the flip flops. The interval counter 130 establishes the time intervals in which the counter 112 counts the transitions of the flip flops. The logic element 114 repeats the counting of the transitions of the flip flops for different time intervals to generate a jitter histogram 300 (FIG. 3) of the digital signal.

This circuit measures the jitter of a high speed digital signal without the need for a precision clock. To the contrary, the non-critical clock 128 is only a simple local oscillator and is devoid of circuitry that filters or refines the oscillator signal. Further, the clock is not calibrated with any elements outside the circuit as the clock is merely a period counting element that only needs to be accurate with respect to itself. This substantially reduces the cost of the clock compared to highly accurate critical clocks that are calibrated with external sources and that are used conventionally.

Thus, the jitter measurement is entirely self referenced, and only uses an accurate clock for occasional timing calibration and counting. The calibration clock can be provided by most ordinary crystal oscillators and does not need to be an expensive low jitter clock. By splitting the signal and using a delayed copy of itself as a reference, a very precise jitter measurement can be made with commercially available digital delay lines and counters.

Figure 2:
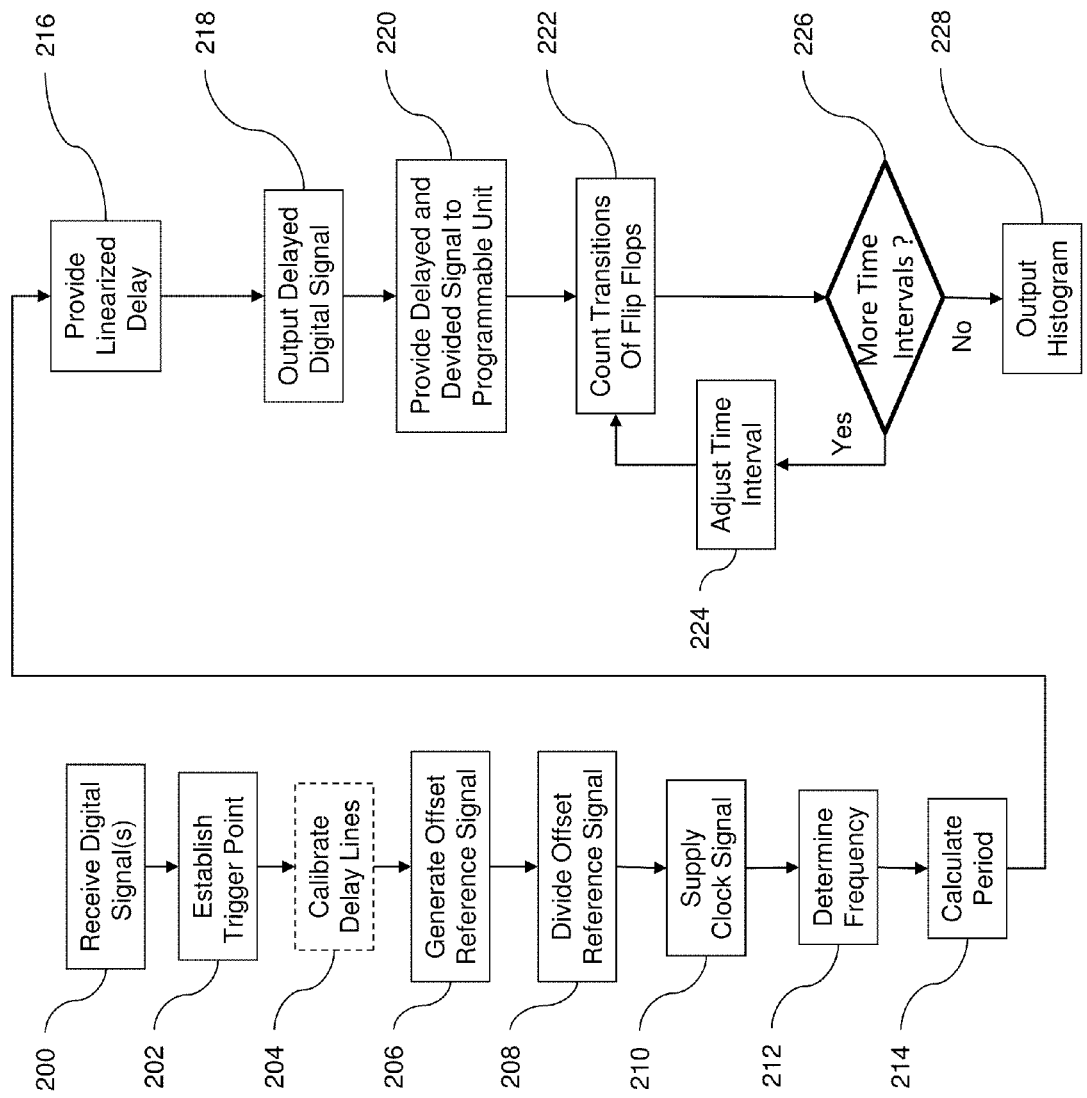
FIG. 2 is a flow diagram illustrating embodiments herein.

As shown in FIG. 2, one exemplary method embodiment for digitizing jitter in a high speed digital signal receives the digital signal into the circuit in item 200. The method establishes the trigger point within the digital signal for jitter analysis in item 202 using the comparator. The method can optionally calibrate delay lines within the circuit using the feedback loop as shown in the dashed box 204. The method also generates the offset reference signal from the digital signal using the reference signal generator in item 206. The method divides the offset reference signal into the divided signal using the programmable unit (that comprises the flip flops) in item 208.

In item 210, the method supplies the clock signal to the counter using the clock generator. In item 212, the method determines the frequency of the divided signal using the clock signal and the counter. The method then calculates the period of the divided signal based on the frequency using the logic element (by calculating the inverse of the frequency) in item 214.

In item 216, the method provides the linearized delay for the jitter analysis based on the period of the divided signal using the delay shift circuit (referring to the linearization table 132). Further, in item 218, the method outputs the delayed digital signal from the digital signal based on the linearized delay using the measure delay circuit.

The method supplies the divided signal and the delayed digital signal to the programmable unit in item 220. The flip flops within the programmable unit transition when the offset referenced signal differs from the delayed digital signal. The method counts transitions of the flip flops using the counter in item 222. As shown in item 224, the time interval is adjusted and as shown by the arrows, the process loops back to item 222 and repeats the counting of the transitions of the flip flops for different time intervals to generate the jitter histogram of the digital signal the logic element. The method establishes the time intervals in which the counter counts the transitions of the flip flops using the interval counter. Once all the time intervals have been evaluated in item 226, the method outputs the histogram in item 228. One example of such a histogram is shown as item 300 in FIG. 3.

Thus, as mentioned above, the jitter measurement is entirely self referenced, and only uses an accurate clock for occasional timing calibration and counting. The calibration clock can be provided by most ordinary crystal oscillators and does not need to be an expensive low jitter clock. By splitting the signal and using a delayed copy of itself as a reference, a very precise jitter measurement can be made with commercially available digital delay lines and counters. Thus, unlike conventional systems, the present embodiments do not need a precision reference clock or utilize ADCs (Analog to Digital Converters) or DACs (Digital to Analog Converters) or an analog phase detector circuit.

Thus, with embodiments herein, no precision external clock is needed which reduces added jitter that can come from an external clock. With embodiments herein, the signals are referenced to themselves, not to a clock, and the clock is used only to define time intervals and periods. Depending on the delay block used, sub picosecond accuracy is possible with the embodiment herein. The delay block can be easily linearized and verified using a ring oscillator feedback, to measure the frequency. Further, with embodiments herein, very fast measurements can be accomplished compared to instrument based testing (~1 ms with 1 us/step 1000 steps).

While one embodiment is shown in FIG. 1, one ordinarily skilled in the art would understand that the concepts herein can be implemented in several ways. One possibility is discrete components on a circuit board with automate test equipment (ATE) processing the data. Alternatively, embodiments could use discrete components, such as the logic element 114, on a circuit board and a field-programmable gate array (FPGA). Further, the embodiments herein could take the form of a custom chip such as an application specific integrated circuit (ASIC). Further, a built in self test (BIST) implementation is also practical.

With embodiments herein, true single cycle jitter is measured. Further, random or deterministic jitter can be extracted from the captured data. As shown above, several cycles also possible, with the maximum number of cycles being limited by the length of the delay chain. With the embodiments herein, frequencies in excess of 1 Ghz are possible and the number of cycles captured is almost unlimited. The embodiments herein allow very fast retrigger time for fast jitter digitization. Other measurements provided by the embodiments herein include frequency, rise or fall time, propagation delay, phase error AC amplitudes at full speed (>1 Ghz), etc.

The resulting integrated circuit chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
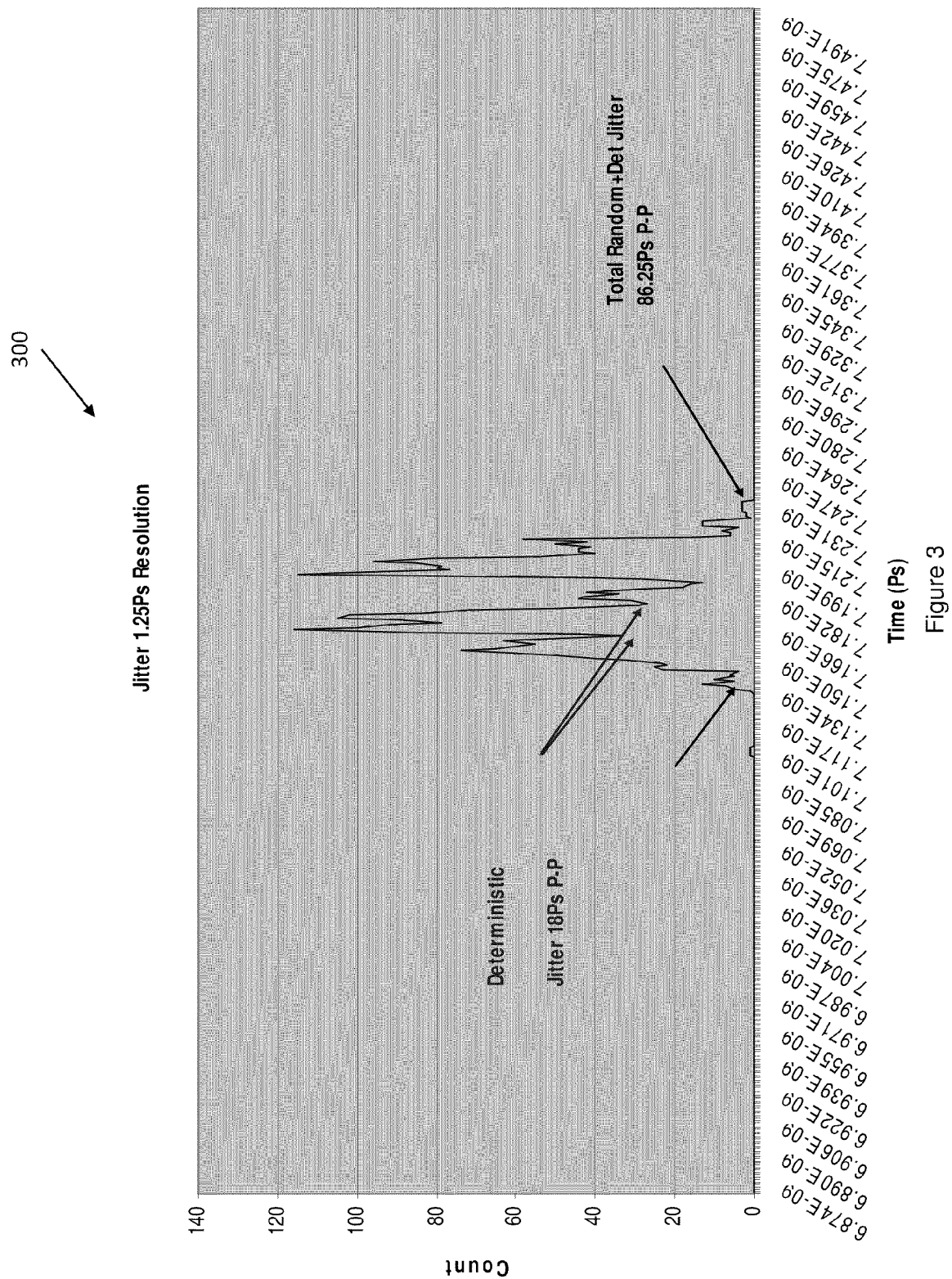
FIG. 3 is a histogram produced by embodiments herein.
Figure 4:
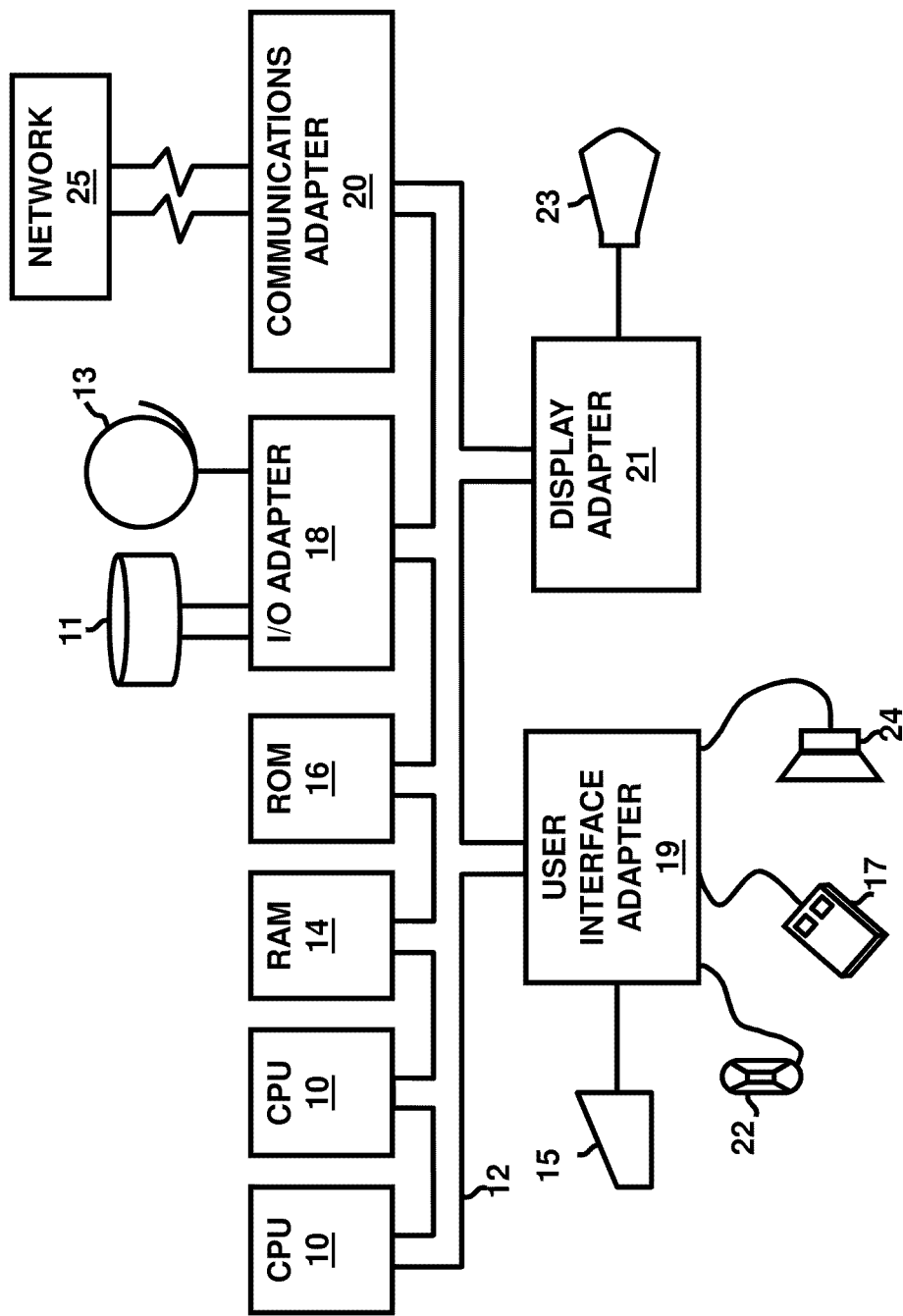
FIG. 4 is a schematic diagram illustrating an exemplary hardware environment that can be used to implement the embodiments of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

What is claimed is:

1. A circuit for digitizing jitter in a high speed digital signal, said circuit comprising:
    a comparator establishing a trigger point within a digital signal for jitter analysis by comparing an input signal to a phase locked loop to an output signal of said phase locked loop and outputting said digital signal;
    a reference signal generator receiving said digital signal from said comparator and generating an offset reference signal based on said digital signal;
    a measure delay circuit receiving said digital signal from said comparator and outputting a delayed digital signal based on said digital signal;
    a programmable unit receiving said offset reference signal from said reference signal generator and said delayed digital signal from said measure delay circuit, said programmable unit comprising flip flops and said flip flops transitioning when said offset reference signal crosses said delayed digital signal;
    a counter counting transitions of said flip flops during established time intervals to determine a frequency of said digital signal;
    a clock generator;
    an interval counter operatively connected between said clock generator and said counter, said clock generator supplying a clock signal to said interval counter and said interval counter establishing said time intervals based on said clock signal;
    a logic element operatively connected to said counter, said logic element calculating a period of said digital signal based on said frequency;
    a delay shift circuit operatively connected between said logic element and said measure delay circuit, said delay shift circuit providing a linearized delay for said jitter analysis based on said period of said digital signal, said measure delay circuit outputting said delayed digital signal from said digital signal based on said linearized delay, and said logic element repeating said counting of said transitions of said flip flops for different time intervals to generate a jitter histogram of said digital signal.

2. The circuit according to claim 1, said clock generator comprising a local clock generator.

3. The circuit according to claim 1, further comprising a linearization table operatively connected to said delay shift circuit, said delay shift circuit using said linearization table to calculate said linearized delay.

4. The circuit according to claim 1, further comprising a feedback loop operatively connected between said comparator and said measure delay circuit, said feedback loop calibrating delay lines within said circuit and comprising a ring oscillator.

5. A circuit for digitizing jitter in a high speed digital signal, said circuit comprising:
    a comparator establishing a trigger point within a digital signal for jitter analysis by comparing an input signal to a phase locked loop to an output signal of said phase locked loop and outputting said digital signal;
    a feedback loop operatively connected to said comparator, said feedback loop calibrating delay lines within said circuit;
    a reference signal generator receiving said digital signal from said comparator and generating an offset reference signal from said digital signal;
    a measure delay circuit receiving said digital signal from said comparator and outputting a delayed digital signal based on said digital signal;
    a programmable unit receiving said offset reference signal from said reference signal generator and said delayed digital signal from said measure delay circuit, said programmable unit comprising flip flops and said flip flops transitioning when said offset reference signal crosses said delayed digital signal;
    a counter counting transitions of said flip flops during established time intervals to determine a frequency of said digital signal;
    a clock generator;
    an interval counter operatively connected between said clock generator and said counter, said clock generator supplying a clock signal to said interval counter and said interval counter establishing said time intervals based on said clock signal;

a logic element operatively connected to said counter, said logic element calculating a period of said digital signal based on said frequency; and a delay shift circuit operatively connected between said logic element and said measure delay circuit, said delay shift circuit providing a linearized delay for said jitter analysis based on said period of said digital signal, said measure delay circuit outputting said delayed digital signal from said digital signal based on said linearized delay, and said logic element repeating said counting of said transitions of said flip flops for different time intervals to generate a jitter histogram of said digital signal.

6. The circuit according to claim 5, said clock generator comprising a local clock generator.

7. The circuit according to claim 5, further comprising a linearization table operatively connected to said delay shift circuit, said delay shift circuit using said linearization table to calculate said linearized delay.

8. The circuit according to claim 5, said feedback loop further comprising a ring oscillator operatively connected between said comparator and said measure delay circuit.

9. A method for digitizing jitter in a high speed digital signal, said method comprising:

establishing a trigger point within a digital signal for jitter analysis by using a comparator to compare an input signal to a phase locked loop to an output signal of said phase locked loop and to output said digital signal to a reference signal generator and a measure delay circuit;

generating, by said reference signal generator, an offset reference signal based on said digital signal, said offset reference signal being output to a programmable unit comprising flip flops;

outputting, by said measure delay circuit to said programmable unit, a delay digital signal based on said digital signal;

transitioning, by said flip flops, when said offset reference signal crosses said delayed digital signal;

supplying, by a clock generator, a clock signal to an interval counter operatively connected between said clock generator and said interval counter;

establishing, by said interval counter, time intervals based on said clock signal;

counting, by said counter, transitions of said flip flops during said time intervals to determine a frequency of said digital signal;

calculating, by a logic element operatively connected to said counter, a period of said digital signal based on said frequency;

providing, by a delay shift circuit operatively connected between said logic element and said measure delay circuit, a linearized delay for said jitter analysis based on said period of said digital signal, said delayed digital signal being output from said measure delay circuit based on said linearized delay; and repeating, by said logic element, said counting of said transitions of said flip flops for different time intervals to generate a jitter histogram of said digital signal.

10. The method according to claim 9, said clock generator comprising a local clock generator.

11. The method according to claim 9, said providing of said linearized delay further comprising using a linearization table to calculate said linearized delay.

12. The method according to claim 9, further comprising calibrating delayed lines using a feedback loop comprising a ring oscillator operatively connected between said comparator and said measure delay circuit.

13. A method for digitizing jitter in a high speed digital signal, said method comprising:

establishing a trigger point within a digital signal for jitter analysis by using a comparator to compare an input signal to a phase locked loop to an output signal of said phase locked loop and to output said digital signal to a reference signal generator and a measure delay circuit;

calibrating delay lines within said circuit using a feedback loop between said comparator and said measure delay circuit;

generating, by said reference signal generator, an offset reference signal based on said digital signal, said offset reference signal being output to a programmable unit comprising flip flops;

outputting, by said measure delay circuit to said programmable unit, a delay digital signal based on said digital signal;

transitioning, by said flip flops, when said offset reference signal crosses said delayed digital signal;

supplying, by a clock generator, a clock signal to an interval counter operatively connected between said clock generator and said interval counter;

establishing, by said interval counter, time intervals based on said clock signal;

counting, by said counter, transitions of said flip flops during said time intervals to determine a frequency of said digital signal;

calculating, by a logic element operatively connected to said counter, a period of said digital signal based on said frequency;

providing, by a delay shift circuit operatively connected between said logic element and said measure delay circuit, a linearized delay for said jitter analysis based on said period of said digital signal, said delayed digital signal being output from said measure delay circuit based on said linearized delay;

counting transitions of said flip flops using said counter; and repeating, by said logic element, said counting of said transitions of said flip flops for different time intervals to generate a jitter histogram of said digital signal.

14. The method according to claim 13, said clock generator comprising a local clock generator.

15. The method according to claim 13, said providing of said linearized delay further comprising using a linearization table to calculate said linearized delay.

16. The method according to claim 13, said calibrating of said delayed lines comprising using a ring oscillator within said feedback loop.

* * * * *